United States Patent
Ramsauer et al.

(10) Patent No.: US 10,362,729 B2
(45) Date of Patent: Jul. 30, 2019

(54) MACHINE FOR HARVESTING ROOTS SUCH AS BEETS, HAVING A MEANS FOR AUTOMATIC ADJUSTMENT OF THE HARVESTING UNIT

(71) Applicant: EXEL INDUSTRIES, Paris (FR)

(72) Inventors: Josef Ramsauer, Schierling (DE); Eduard Richer, Hagelstadt (DE); Michael Gallmeier, Ergoldsbach (DE)

(73) Assignee: EXEL INDUSTRIES, Paris (FR)

( * ) Notice: Subject to any disclaimer, the term of this patent is extended or adjusted under 35 U.S.C. 154(b) by 8 days.

(21) Appl. No.: 15/127,198

(22) PCT Filed: Mar. 18, 2015

(86) PCT No.: PCT/FR2015/050666
§ 371 (c)(1),
(2) Date: Sep. 19, 2016

(87) PCT Pub. No.: WO2015/140471
PCT Pub. Date: Sep. 24, 2015

(65) Prior Publication Data
US 2017/0105337 A1    Apr. 20, 2017

(30) Foreign Application Priority Data
Mar. 18, 2014 (FR) ...................... 14 52198

(51) Int. Cl.
*A01D 27/00* (2006.01)
*A01D 33/00* (2006.01)

(52) U.S. Cl.
CPC ............. *A01D 27/00* (2013.01); *A01D 33/00* (2013.01)

(58) Field of Classification Search
CPC ................................ A01D 27/00; A01D 33/00
See application file for complete search history.

(56) References Cited

U.S. PATENT DOCUMENTS 3,959,924 A * 6/1976 Allen, Jr. ............... A01B 41/06
                                                           172/6
5,363,634 A * 11/1994 Saito ...................... A01D 23/04
                                                           171/17

FOREIGN PATENT DOCUMENTS

| DE | 19848484 A1 | 4/2000 | |
| DE | 102011051672 A1 | 1/2013 | |
| EP | 0077459 A1 * | 4/1983 | ............. A01D 23/02 |
| EP | 1772050 A1 | 4/2007 | |
| FR | 2800233 A1 | 5/2001 | |

(Continued)

OTHER PUBLICATIONS

International Search Report dated Jun. 3, 2015 re: Application No. PCT/FR2015/050666; pp. 1-3; citing: DE 198 48 484 A1, EP 1 772 050 A1 and DE 10 2011 051672 A1.

*Primary Examiner* — Jamie L McGowan
(74) *Attorney, Agent, or Firm* — Cantor Colburn LLP

(57) ABSTRACT

Machine for harvesting roots planted in the ground and aligned in rows, comprising a unit (36) for horizontally cutting the head of the roots, said unit having a means for automatically adjusting the level of its cutting blade depending on the level of this head, and being followed by a harvesting unit (48) that hollows out the earth beneath the roots at a relative height beneath the cutting level, characterized in that it has a means for detecting the height of the top of the root e, and a means for adjusting the relative height of the harvesting unit (48) with respect to the cutting level, depending on this height.

12 Claims, 3 Drawing Sheets

(56) References Cited

FOREIGN PATENT DOCUMENTS

KR        2015086411 A  *  7/2015
KR       20150086411 A  *  7/2015

* cited by examiner

MACHINE FOR HARVESTING ROOTS SUCH AS BEETS, HAVING A MEANS FOR AUTOMATIC ADJUSTMENT OF THE HARVESTING UNIT

TECHNICAL FIELD

The present invention concerns a machine for harvesting roots planted in the ground along rows, such as beets, as well as a harvesting method intended for such a machine.

BACKGROUND

In order to harvest alignments of roots aligned along longitudinal rows, as they mature, in particular in order to harvest sugar beets, a known type of machine, presented in particular in document EP-B1-1772050, includes an assembly disposed at the front of a powered tractor, comprising successively starting from the front, guide wheels, a unit for stripping most of the leaves, a horizontal cutting unit of the head of the beets so as to eliminate the remaining leaves and scalp the beet, and a harvesting unit which digs the ground beneath the beets so as to extract them, eliminate the soil, and lift them towards a storage means.

In the remainder of this document, the term beet will encompass all types of roots which may be harvested with these machines.

The unit for cutting the head of the beets includes for each row a horizontal cutting blade, comprising just in the front a vertical guide or cam, presenting parallel bars forming a curve rising at the front so as to slide over the top of the beet to be cut, which is terminated rearwards slightly above the blade.

For each row of beets, the cutting unit is mounted on a substantially balanced support which enables a rise and a descent of the guide bearing successively on the top of each of the beets. In this manner, the blade following behind being adjusted slightly beneath this guide, cuts the beet horizontally just beneath its top.

The harvesting unit following this cutting unit also includes a height positioning related to the level of the cutting blade, so as to dig the soil according to a predefined height relative to the cutting level. Thus, an optimization of the soil digging depth is achieved, for beets including a standard height.

Nonetheless, this type of automatic adjustment of the level of the harvesting unit is not optimized in all cases. In particular, if the beets are smaller with a reduced height, or in the case of an absence of beets, the ground will be dug too deep or uselessly, with a very high fuel consumption to power the machine. Conversely, if the beets are bigger with a more significant height, there will then be the risk of damaging their bases and loose a portion of the harvest because we would have not dug deep enough.

BRIEF SUMMARY

The present invention aims in particular to avoid these drawbacks of the prior art.

To this end, it proposes a machine for harvesting roots planted in the ground and aligned along rows, comprising a horizontal cutting unit of the head of the roots provided with a means for automatically adjusting the level of its cutting blade based on the level of this head, which is followed by a harvesting unit digging the ground beneath the roots at a relative height below the cutting level, characterized in that it includes a means for detecting the height of the top of the root, and a means for adjusting the relative height of the harvesting unit relative to the cutting level, based on this height.

An advantage of this machine is that depending on the height of the top of the root indicated by the height detection means, the harvesting unit may then be adjusted to the just necessary depth. Thus, an optimum digging of the soil is ensured which allows reducing the fuel consumption by digging less deep when the beet is high, and the risks of damaging the roots are reduced by digging deeper when the beet is deep.

The machine for harvesting roots according to the invention may further include one or several of the following features, which may be combined together.

Advantageously, the detection means detects, besides the height of the top of the root, the passage duration of a cutting guide over this root, the adjustment means allowing adjusting the relative height of the harvesting unit relative to the cutting level based on this height and on this passage duration over the top.

An advantage of such a harvesting machine is that depending on the height of the top of the root indicated by the height detection means, and on the size indicated by the passage duration, extended when these roots are bigger and reduced when they are smaller, it is possible to easily deduce indications regarding their dimension and thereby adjust the harvesting unit to the just necessary depth in an optimized manner. Thus, an optimum digging of the soil is ensured which allows reducing the fuel consumption by digging less deep when the beet is high, and the risks of damaging the roots are reduced by digging deeper when the beet is deep.

Advantageously, the means for detecting the passage duration over the top of the root includes a means which detects the force or the deformation of the support of the cutting blade of the cutting unit, which is flexible. This type of sensor gives the indication of the passage duration of the cutting head over each root in a simple manner.

In this case, the blade of the cutting unit is mounted on a parallelogram, creating, during the passage of the cutting guide over the root, a movement of this parallelogram which is measured by an angle sensor. Thus, throughout the duration of the parallelogram rise, both the height of the beet and the size of the top of the beet are identified.

Advantageously, the means for adjusting the relative height of the harvesting unit includes a hydraulic cylinder driven by an electronic control unit. As they generate significant forces, the hydraulic cylinders allow high accelerations thereby providing good dynamics.

Advantageously, the harvesting machine includes a device allowing the driver to predefine, for each row, an average level of the harvesting unit prior to its automatic adjustment by the adjustment means. Thus, the stroke to achieve in order to adjust the relative height of the harvesting unit is thus reduced on the average.

Advantageously, each harvesting unit includes a height sensor. Thus, it is possible to adjust its height by means of a closed-loop control.

An operation method of a machine for harvesting roots planted in the ground and aligned along rows is herein disclosed, the method generally comprising a horizontal cutting unit of the head of the roots provided with a means for automatically adjusting the level of its cutting blade based on the level of this head, which is followed by a harvesting unit digging the ground beneath the roots at a relative height below the cutting level, this method performing a detection of the height of the top of the root, and then an adjustment of the relative height of the harvesting unit relative to the cutting level, based on this height.

Advantageously, the method includes a step of detecting the passage duration over the root by the cutting unit, the relative height of the harvesting unit relative to the cutting level being adjusted based on this passage duration over the root.

Advantageously, the operation method includes a preliminary step of predefining the average level of the harvesting unit.

Advantageously, starting from the average relative height, for a significant passage duration of the cutting unit over the root, the operation method increases this relative height, and for an average duration, it keeps this relative height, and for a short duration, it reduces this relative height.

Advantageously, in the absence of any detected root, the operation method sets the relative height to the minimum.

BRIEF DESCRIPTION OF THE DRAWINGS

The invention will be better understood and other features and advantages will appear more clearly upon reading the description hereinafter given as example, with reference to the appended drawings in which.

DETAILED DESCRIPTION

It is to be noted that the following schemes and explanations are based on a harvesting machine with six rows. The invention applies in the same manner to harvesting machines adapted to a smaller or larger number of rows. In particular, the larger is the number of uprooted rows, and the greater will be the benefits related to the invention. Indeed, the irregularities of the terrain and of the beets will be higher over eight, nine or twelve rows than over six rows. Hence, an optimization of the depth of the harvesting level of each row will result in an increased benefit.

Figure 1:
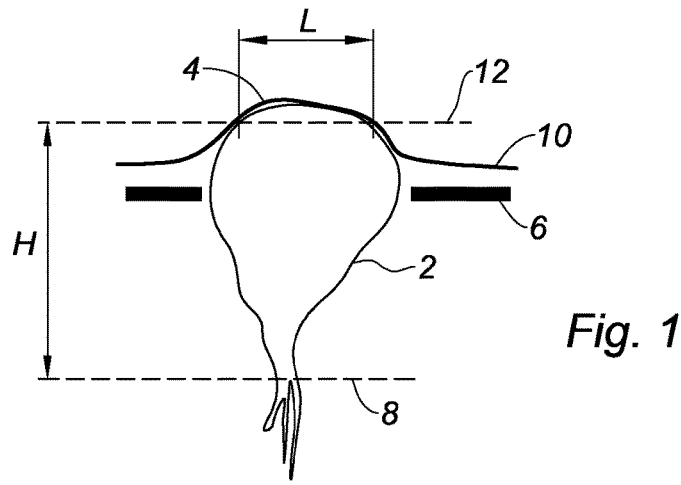
FIG. 1 is a longitudinal sectional view of a beet planted in the soil, ready to be harvested.

FIG. 1 presents a beet 2 buried in the soil including a surface level 6, which has to be harvested as it matures.

To be harvested, the top of each beet 2 has to be first cut horizontally along the cutting level 12 located slightly beneath its top 4, in order to eliminate the leaves growing on this beet. The cutting of the top of the beet 4 then leaves a cutting plane with a width L, which depends on the size of this beet.

The harvesting machine according to the prior art, including a means for automatically adjusting the cutting level, is provided with a guide at the front of the cutting blade which follows the upper contour of the beets 2 when advancing, in order to achieve the placement of the blade at the proper cutting level 12.

The harvesting level located in the soil 8 represents the ideal level for digging the soil in order to harvest the beet 2, just beneath its main volume. Digging too deep uselessly consumes more energy to power the harvesting machine, and results in too much soil with the beets 2, while digging not deep enough risks damaging these beets.

Then, we obtain for each beet a relative height H comprised between the cutting plane 12 and the harvesting level 8, which may vary within the same row depending on numerous parameters, comprising in particular the local quality of the soil, the moisture content, the longitudinal space between two beets, the burial depth of this beet, and the yield proper to each of the beets.

Figure 2A:
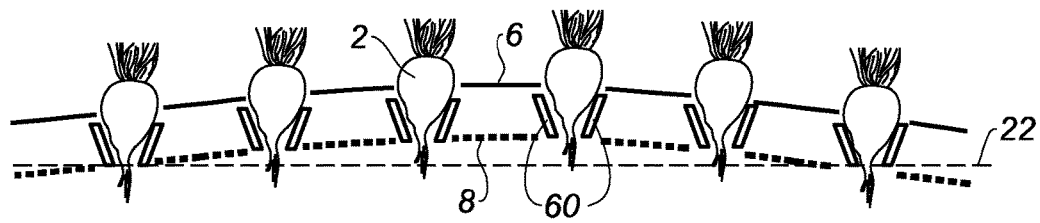
FIGS. 2a, 2b and 2c are cross-sectional views of six rows of beets corresponding to the cutting width of a harvesting machine.
Figure 2B:
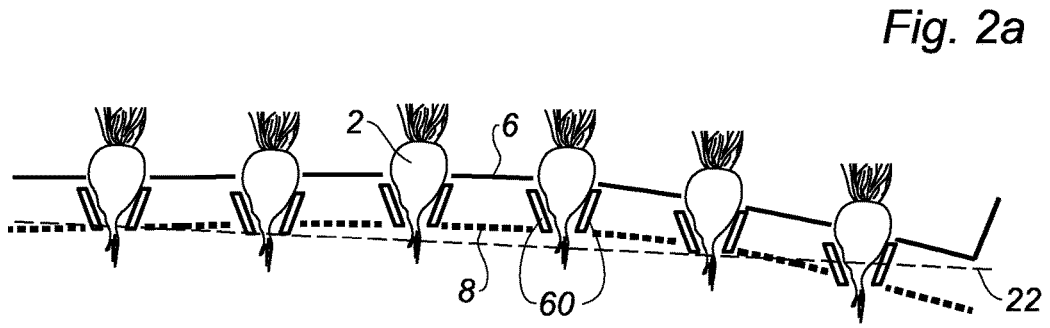
Figure 2C:
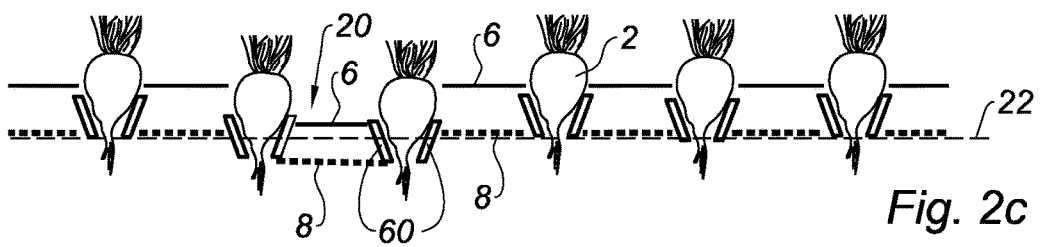

FIGS. 2a, 2b and 2c present different possible deformations of the harvesting field which extend longitudinally over this entire field, over six rows of beets which are harvested at the same time.

The line 22 represents the general inclination of the harvesting machine, the upper curve 6 represents the level of the surface of the soil, and the lower curve 8 represents the desired harvesting level set individually for each row, corresponding to the base of the lateral blades 60 of the harvesting unit brought to dig the ground just beneath each beet.

FIG. 2a presents a cross-section of the surface of the soil 6 which is convex, the harvesting level 8 of the rows two to five has to be raised.

FIG. 2b presents a cross-section of the surface of the soil 6 which falls down on the right side, for example at the boundary of a field, the harvesting machine being inclined. The harvesting level 8 of the rows two to four has to be raised, the harvesting level of row six has to be lowered.

FIG. 2c presents a cross-section of the surface of the soil 6 comprising a space 20 between the rows two and three which has been compacted by the passage of a machinery, thereby forming a rail. The harvesting level 8 of rows two and three has to be lowered.

Figure 3:
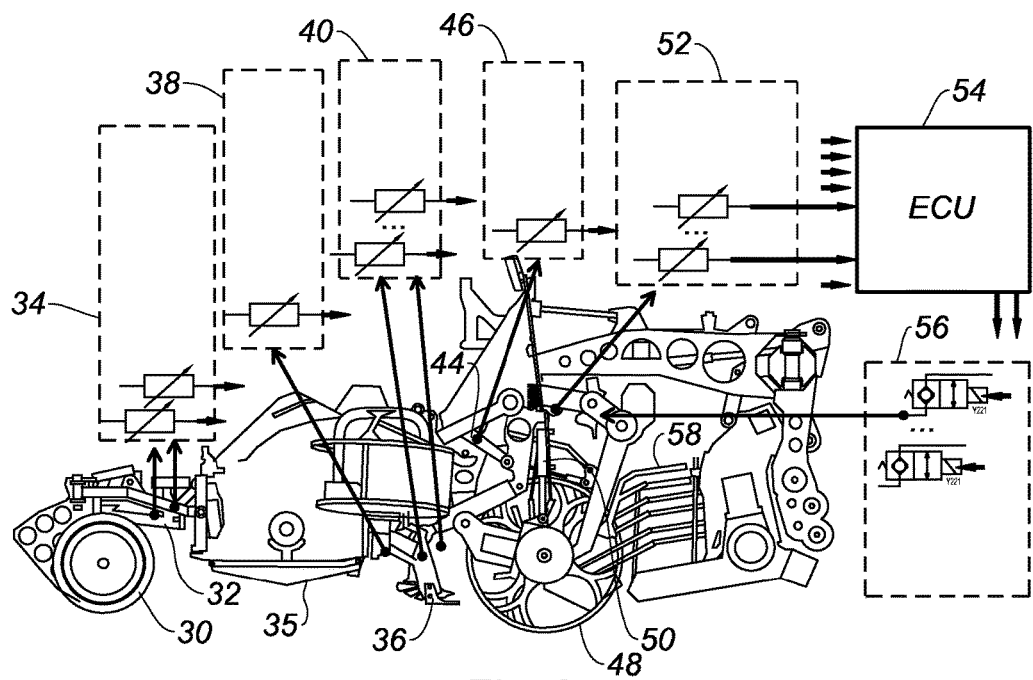
FIG. 3 is a side view of a harvesting machine according to one embodiment of the invention.
Figure 4:
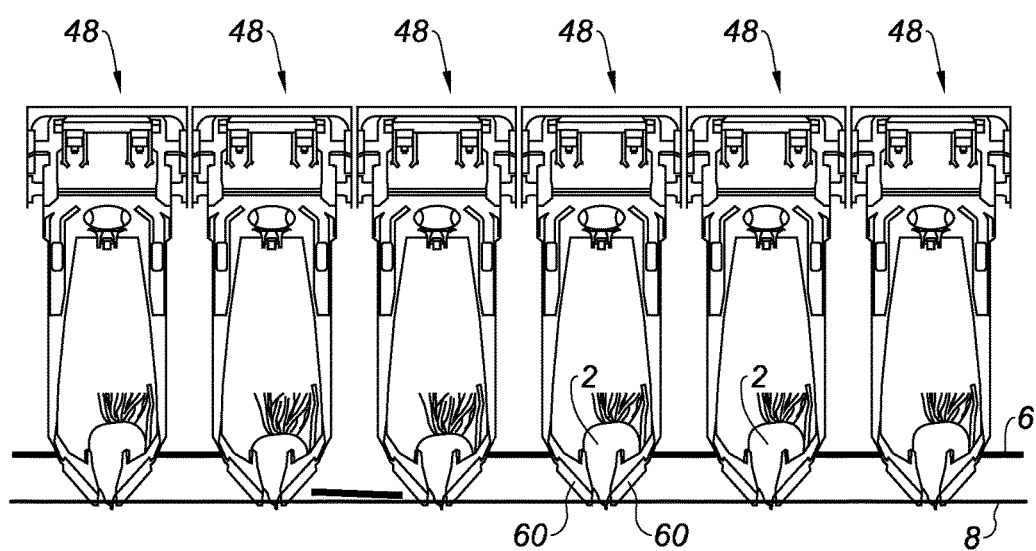
FIG. 4 is a cross-sectional view of the harvesting units of this machine.

FIG. 3 presents a harvesting machine including at the front two independent guide wheels 30 intended to follow the rows of beets, which are connected to the entire machine by articulated arms 32 each provided with a position sensor 34 sending a signal to the electronic control unit 54.

The guide wheels 30 allow determining the line 22 representing the general inclination of the harvesting machine, the individual harvesting levels of each row 8 being determined with respect to this line.

Afterwards, there is a leaf-stripping unit 35 which removes most of the leaves of the beets.

Afterwards, there are six independent units for cutting the head of the beets 36 transversely aligned, each comprising upstream of the horizontal cutting blade a guide means curved at the front which is brought to slide over the top of each beet, in order to adjust the height of this blade located just behind.

The predefined height of the cutting unit 36 is measured by the sensor 38.

Each cutting unit 36 comprises a guide and a cutting blade mounted on a deformable parallelogram fitted with an angle sensor 40, which allows measuring the relative height of the guide as it passes over the beet 2, and therefore the height of the top 4 of this beet. This angle sensor 40 also allows measuring the duration during which the guide and the cutting blade are raised, which allows deducing the size of the beet 2.

The information on the height of the cutting unit 36 and on the deformation of the parallelogram 40 is sent to the electronic control unit 54. Thus, a succession of signals over time is obtained giving, if the forward speed of the harvesting machine is known, the indication of the width of each beet by measuring, thanks to the angle sensor 40, the duration of the parallelogram rise, and the indication of the height of the top of the beet 4 from the inclination of this parallelogram.

Behind each unit for cutting beets 36, there is a harvesting unit 48 comprising a wheel presenting at each side the succession of blades 60 which are brought to dig the ground just beneath each beet in order to uproot them, and send them to the rear where they are undertaken by a lifting system 58.

Each of the six harvesting units 48 has a predefined average level relative to the harvesting machine, set by a cylinder 44 based on the position of the leaf-stripper 35.

For each row of beets, the driver can predefine the average level of each harvesting unit 48, based on the general condition of the surface of the soil 6 of this row, as presented in FIGS. 2*a*, 2*b* and 2*c*. Each harvesting unit 48 is provided with more than one independent hydraulic cylinder 50 for modifying its height relative to its predefined average height, which adds or subtracts a small value so as to give an adjustable relative height H, which is driven by hydraulic valves 56 controlled by the electronic control unit 54.

Based on all the received information, in particular those given by the angle sensor 40 indicating the duration and the height, the electronic control unit 54 reacts very rapidly so as to accurately adjust the relative height H, in order to obtain the proper harvesting level 8 adapted to each beet 2 which has just been cut.

Alternatively, the beet cutting detection may include a different measuring means, such as a pressure or force sensor, a physical probe, a multi-dimensional scanner or a three-dimensional camera.

Figure 5:
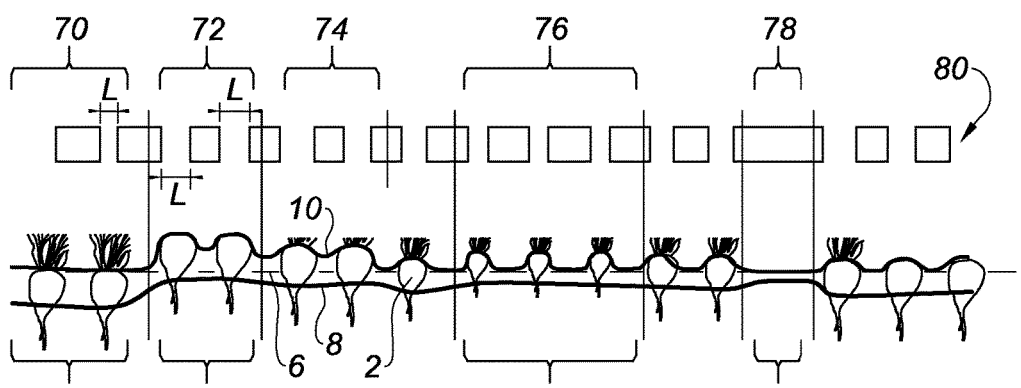
FIG. 5 presents the operation of this machine on a longitudinal sectional view of a row of beets.

FIG. 5 presents the curve of the cutting level 10 given by the angle sensor 40, and the signal 80 sent by this sensor, comprising rectangles indicating the absence of rise of the parallelogram holding the cutting blade, and spaces L between these rectangles indicating the times of passage over the beets by the guide of the cutting blade.

The adopted strategy is the following, illustrated by sets of beets comprising successively, starting from the left side of the drawing, a first set 70, a second set 72, a third set 74, a fourth set 76 and a space 78 left empty.

As regards the set 70, the beets 2 are big and their top is at the average level of the soil. These characteristics are detected by the angle sensor 40 of the parallelogram of the cutting blade, and by a significant time of passage over the beet. The relative height H is increased so as to ensure not to damage the base of this beet.

As regards the set 72, the beets are big and have grown out of the ground. These characteristics are detected by the angle sensor 40 of the parallelogram of the cutting blade, and by a time of passage over the beet. The relative height H is also significant, but since the height of the top of the beets is high, the harvesting unit will be raised relative to its average position.

In the case of the set 76, we have small beets, which have grown relatively above the level of the soil. Hence, the harvesting unit will be raised in order to take into account a small relative height H and a top of the beet which is high. If no beet is detected, which corresponds to an absence of detection by the angle sensor 40, the relative height H is set to the minimum. This characteristic is presented by the empty space 78.

Figure 6:
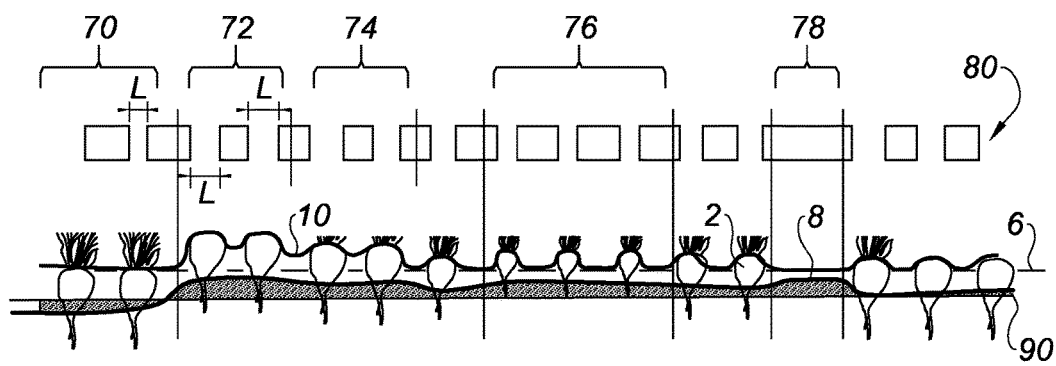
FIG. 6 presents on the same sectional view, the gain in the digging depth enabled by the harvesting machine.

FIG. 6 presents a black surface corresponding to the difference of height between a constant harvesting level 90 used by harvesting machines of the prior art, and the harvesting level 8 optimized by the method according to this embodiment. We notice an absence of damaging of the beets 2, and at the same time, and adjustment of this harvesting level 8 to the highest, reflected in an energy saving for the pulling force of the machine, and in a lesser amount of soil uselessly carried.

Alternatively, the adjustment of the relative height H of the harvesting unit 48 relative to the cutting level 10 may be based only on the height of the top 4 of the root 2 detected by the detection means.

In such a configuration, each cutting unit 36 comprises a guide and a cutting blade mounted on a deformable parallelogram fitted with an angle sensor 40, which allows measuring the relative height of the guide as it passes over the beet 2, and therefore the height of the top 4 of this beet. Afterwards, the information is sent to the electronic control unit 54 which adjusts the relative height H based on the height of the top 4 of this beet in order to obtain a harvesting level 8 adapted to each beet 2 which has just been cut.

Thus, the strategy adopted in this case is substantially similar to the previously described one with the difference that the electronic control unit 54 proceeds to the adjustment of the relative height H based only on the height of the top 4, as if the size of the root was considered to be constant.

Preferably, in this case, the angle sensor 40 allows measuring the maximum heights corresponding to the heights of the tops 4 of the roots and the minimum heights corresponding to the heights without any roots, the electronic control unit 54 comprising a filter allowing smoothing a displacement of the harvesting unit 48 based on a filtered average height of the tops 4 of the beets.

Figure 7:
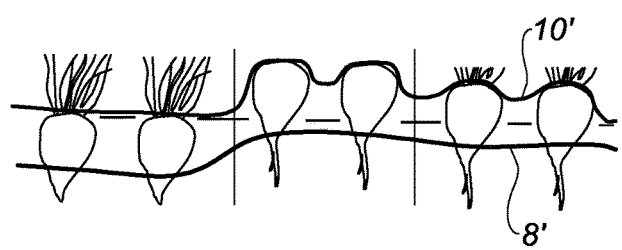
FIG. 7 presents a longitudinal sectional view of a row of beets according to another embodiment.

FIG. 7 presents a curve of the cutting level 10' given by the angle sensor 40, the curve of the harvesting level 8' optimized with the method according to this embodiment corresponding to the smoothing of the curve 10'. In other terms, the operation method of this harvesting machine includes a step of smoothing the displacement of the harvesting unit 48 based on a filtered average height of the top 4 of the beets.

Yet, such a configuration is substantially less accurate than that in which the detection means detects, besides the height of the top of the root, the passage duration of the cutting guide over this top, the adjustment means allowing adjusting the relative height of the harvesting unit relative to the cutting level based on this height and on this passage duration over the top. Nonetheless, one of the advantages of this configuration is that it requires a lower energy consumption, and therefore a lesser fuel consumption.

The invention claimed is:

1. A machine for harvesting roots planted in the ground and aligned along rows, comprising
  a horizontal cutting unit of a head of roots provided with a means for automatically adjusting a level of a cutting blade depending on the level of the head,
  a harvesting unit configured to dig the ground beneath the roots at a relative height below the cutting level, including a means for detecting a height of a top of the root, and a means for adjusting the relative height of the harvesting unit relative to the cutting level, depending on this height.

2. The harvesting machine according to claim 1, wherein the detection means detects, besides the height of the top of the root, a passage duration of a cutting guide over the top, the adjustment means allowing adjusting the relative height of the harvesting unit relative to the cutting level depending on the height and on the passage duration over the top.

3. The harvesting machine according to claim 2, wherein the means for detecting the passage duration over the top of the root includes a means which detects a force or deformation of a support of the cutting blade of the cutting unit, which is flexible.

4. The harvesting machine according to claim 1, wherein the blade of the cutting unit is mounted on a parallelogram, creating, during the passage of the cutting guide over the root, a movement of the parallelogram which is measured by an angle sensor.

5. The harvesting machine according to claim 1, wherein the means for adjusting the relative height of the harvesting unit includes a hydraulic cylinder driven by an electronic control unit.

6. The harvesting machine according to claim 1, further comprising a device allowing the driver to predefine, for each row, an average level of the harvesting unit prior to its automatic adjustment by the adjustment means.

7. The harvesting machine according to claim 6, wherein each harvesting unit includes a height sensor.

8. An operation method of a machine for harvesting roots planted in the ground and aligned along longitudinal rows, comprising a horizontal cutting unit of a head of the roots provided with a means for automatically adjusting a level of a cutting blade depending on a level of the head, which is followed by a harvesting unit digging the ground beneath the roots at a relative height below the cutting level, performing a detection of the height of the top of the root, and adjusting the relative height of the harvesting unit relative to the cutting level, depending on this height.

9. The operation method according to claim 8, further comprising detecting the passage duration over the root by the cutting unit, the relative height of the harvesting unit relative to the cutting level being adjusted depending on this passage duration over the root.

10. The operation method according to claim 8, further comprising a preliminary step for predefining the average level of the harvesting unit.

11. The operation method according to claim 9, further comprising, starting from the average relative height, for a significant passage duration of the cutting unit over the root, increasing the relative height, and for an average duration, keeping the relative height, and for a shorter duration, reducing then relative height.

12. The operation method according to claim 8, further comprising, in the absence of any detected root, setting the relative height to the minimum.

* * * * *